JOSEPH G. S. ROBINSON
FRANK R. ANDERSON
INVENTORS.

BY Norman S. Blodgett

United States Patent Office

3,526,159
Patented Sept. 1, 1970

3,526,159
MACHINE TOOL
Joseph G. S. Robinson, Worcester, and Frank R. Anderson, Shrewsbury, Mass., assignors to The Heald Machine Company, Worcester, Mass., a corporation of Delaware
Filed May 15, 1968, Ser. No. 729,161
Int. Cl. B23b 29/034
U.S. Cl. 77—58      7 Claims

ABSTRACT OF THE DISCLOSURE

This invention has to do with a machine tool having a boring head with an automatic arrangement for adjusting the cutting tool relative to its axis of rotation, the adjustment operating by the use of two sleeves which are operated by pistons and which carry long, lead threads to produce adjustment of a screw-type element which operates on the cutting tool.

BACKGROUND OF THE INVENTION

In the machine tool industry, when generating a surface of revolution by use of a single point tool or the like, it is common practice to have automatic means for adjusting the distance which the point of the tool bears to the axis of rotation. This is particularly true in boring and an apparatus for accomplishing this function is shown in the patent of Townsend 2,826,943. Generally speaking, these devices consist of an elongated rod extending through the spindle of the boring head rotatable by means of an electric motor to produce the adjustment. Electrical apparatus is particularly susceptible to deterioration in the dusty, dirty atmosphere of the machine shop. Furthermore, the maintenance men in the average machine shop are apt to be more familiar with the operation of mechanical-hydraulic equipment than they are with electrical equipment. Electrical apparatus is also expensive and delicate and, in this situation, less than reliable. These and other difficulties experienced with the prior art devices have been obviated in a novel manner by the present invention.

It is, therefore, an outstanding object of the invention to provide a machine tool having means for automatically adjusting the distance from a single point tool to its axis of rotation.

Another object of this invention is the provision of a machine tool including a boring head wherein the adjustment of the tool takes place automatically by fluid means.

A further object of the present invention is the provision of an adjustable boring head wherein the adjusting means is rugged and dependable and capable of a long life of useful service with a minimum of maintenance.

It is another object of the instant invention to provide a boring head having an adjusting means which can be constructed and maintained by persons unfamiliar with the electrical construction.

A still further object of the invention is the provision of a machine tool having means to remotely control the radial position of a cutting tool mounted in a rotating tool holder, which construction is simple and inexpensive.

SUMMARY OF THE INVENTION

In general, the present invention consists of a machine tool having a spindle adapted to be mounted for rotation about a central longitudinal axis, having a cutting tool holder mounted at one end of the spindle for adjustment radially of the axis, having an adjusting bar mounted in the spindle and extending axially thereof to cause, when rotated, a radial adjustment of the tool holder, having two sleeves mounted for sliding motion relative to a rod and having same hand long, lead threads formed on their outer surface, having a piston associated with each sleeve for moving it axially, and having means for introducing pressure fluid to one of the pistons to move it axially and cause the sleeve and rod to rotate.

More specifically, a secondary sleeve is slidably mounted directly on and keyed to the rod, the first-mentioned sleeve is slidably and rotatably mounted on the secondary sleeve, and a toothed coupling is formed to join the piston and the first-mentioned sleeve together during energization of the piston. A coil spring extends around the rod, extends between the two secondary sleeves, and serves to bias each secondary sleeve in a direction opposed to the direction of energization of the piston.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
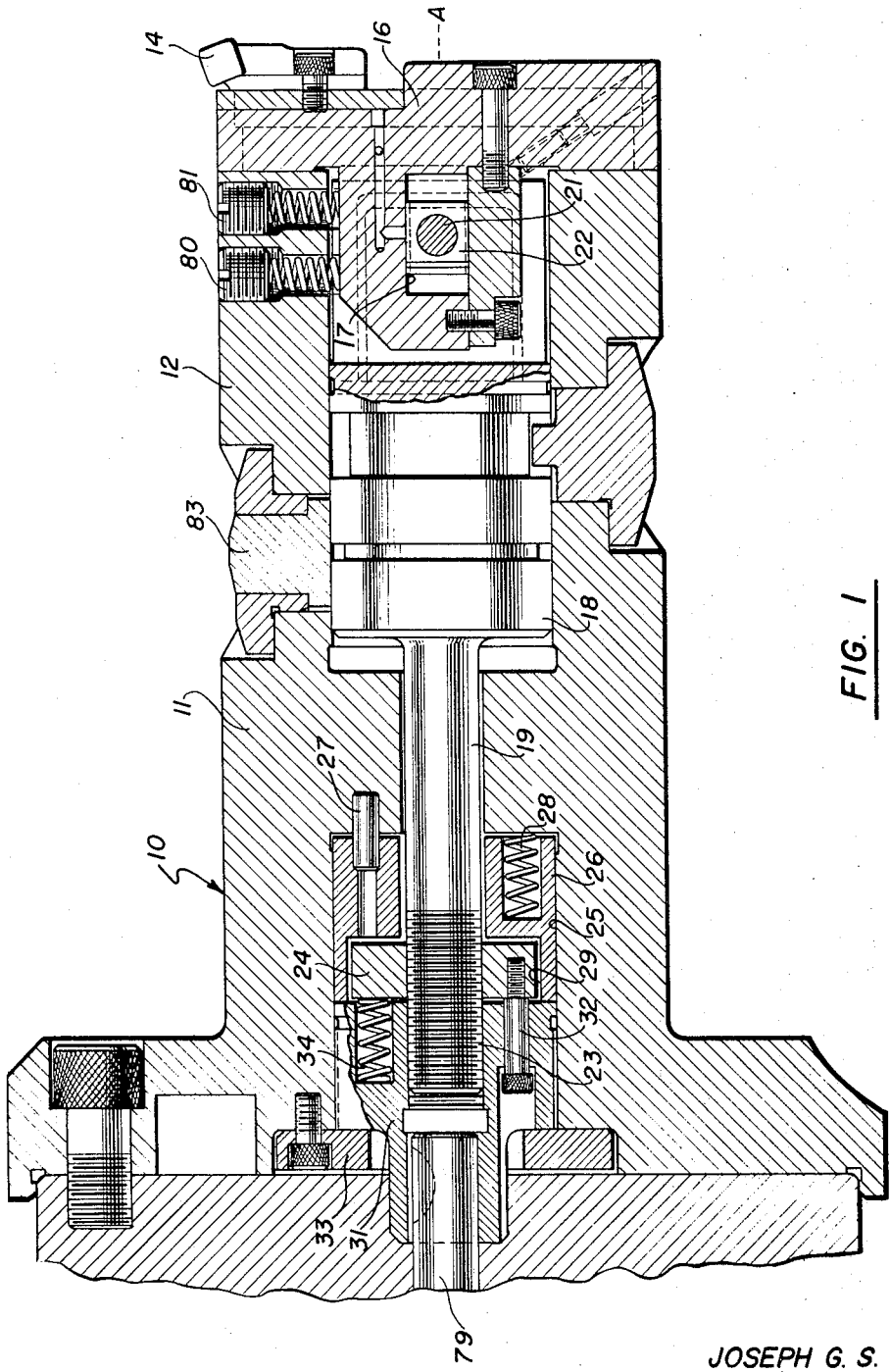
FIG. 1 is a vertical sectional view of one-half of a machine tool embodying the principles of the present invention.
Figure 2:
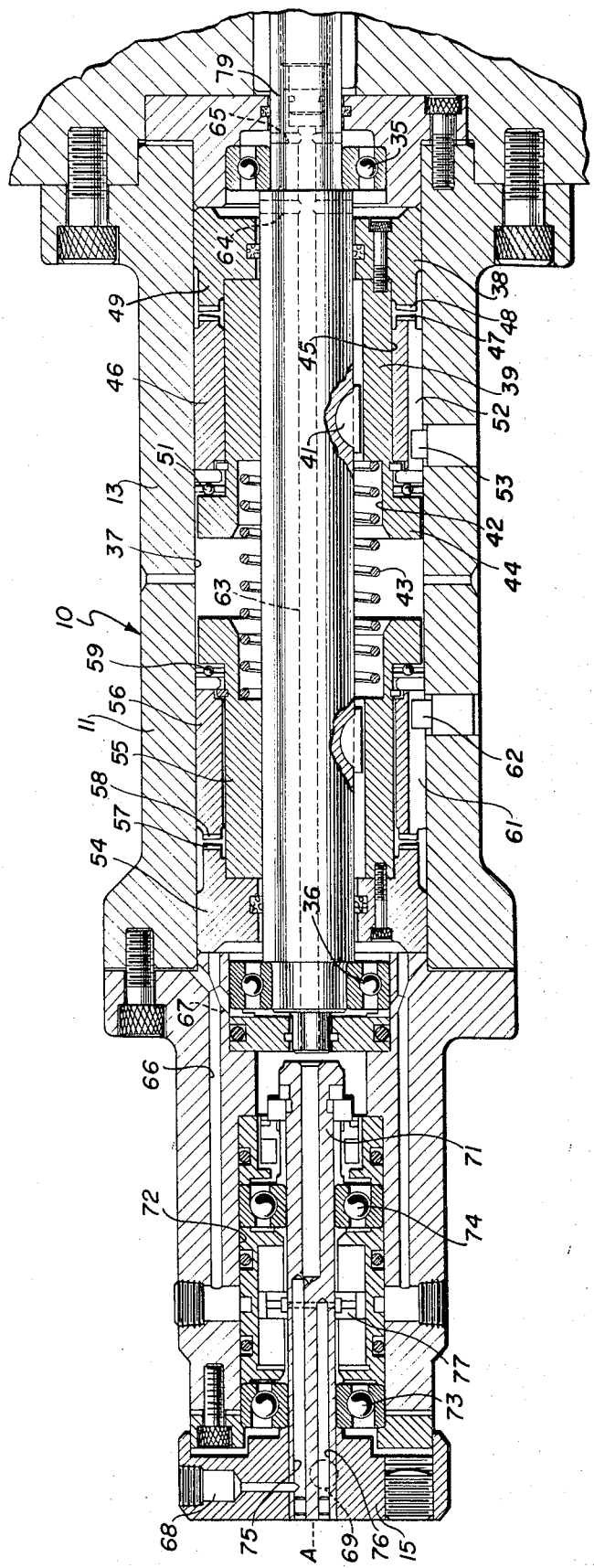
FIG. 2 is a vertical sectional view of the remainder of the machine tool.

Referring to the drawings, the machine tool, indicated generally by the reference numeral 10, and shown because of its length in both FIGS. 1 and 2, is shown as a spindle 11 having an outer portion 12 and an inner portion 13. Generally speaking, the free end of the outer portion 12 is provided with a single point cutting tool 14, while the free end of the inner portion 13 is provided with a block 15 to permit the introduction of fluid pressure into the system.

The entire spindle 11 with its outer portion 12 and its inner portion 13 is mounted on a suitable boring head (not shown) for rotation about its central axis A—A. The cutting tool 14 is mounted on a tool holder 16 which is mounted for transverse sliding motion, i.e., for motion radially of the axis A—A. It is provided in its inner portion with a slot 17 which is provided with opposed parallel flat surfaces which are inclined at a single angle to the axis A—A. The rear portion of the tool holder having the slot 17 formed in it lies in a cylindrical bore coaxial of the axis A—A which carries a piston 18 forming part of a control rod 19. This piston is slotted at its outer end and in the slot resides the rear portion of the tool holder 16. Extending across the slot is a pin 21 carrying a block 22, which block has opposite parallel surfaces which engage the corresponding surfaces of the slot 17. The left-hand end of the rod 19, i.e., the end away from the tool holder 16, is provided with a threaded portion 23 which threadedly engages a nut 31. The left-hand end of the outer portion 12 of the spindle is provided with a counterbore 25 in which resides a block 26. This block is keyed to the body of the outer portion 12 by means of a pin 27 and is biased to the left by coil springs 28. The nut 24 resides loosely in a counterbore 29 formed in the portion of the block 26 that faces to the left and also is threadedly mounted on portion 23 of the rod 19 to eliminate backlash. Also mounted in the counterbore 25 is a nut 31 which is keyed to the nut 24 by means of a stud 32 so that the nut 24 may take up backlash in the threads. A plate 33 locks both blocks in place in the counterbore 25. Coil springs 34 extend between the block 31 and the nut 24 to bias the nut to the right. It can be seen, then, that the block 26 is locked against rotation relative to the outer portion 12 of the spindle, but that the nut 31 and the nut 24 will rotate as impelled by the rod 79. The rod 19 and the rod 79 are separate rods linked together in block 31 by a key between 79 and 31.

Referring now particularly to FIG. 2, it can be seen that the rod 79 is rotatably carried in the inner portion 13 of the spindle by means of ball bearings 35 and 36. The inner portion 13 of the spindle has a large bore 37 extending entirely through it coaxially of the axis A—A. In this bore slides a piston 38. Fastened to the piston is a sleeve 39 which is slidable over the surface of the rod 79 but is keyed thereto by means of a key 41. The sleeve 39 is provided at its end opposite the piston 38 with a counterbore 42 in which resides a coil spring 43. The sleeve 39 is provided at the end occupied by the counterbore 42 with an outwardly-extending flange 44 to retract clutch member 46. The remainder of the sleeve is considerably removed from the surface of the bore and is provided with a cylindrical surface 45. In the annular space between the surface 45 and the surface of the bore 37 resides a sleeve 46. This sleeve at its right-hand end is provided with a series of axially-extending teeth 47 which are complementary to and engage on occasion with a similar set 48 of teeth formed on an axially-extending flange 49 of the piston 38. At its other end the sleeve 46 engages a thrust bearing 51 which lies between that end of the sleeve and a radial surface of the flange 44 of the sleeve 39. Now, the outer surface of the sleeve 46 is formed with a long lead thread 52 and in this thread extends a peg 53 fixed in the main body of the inner portion 13 of the spindle.

At the other end of the bore 37 resides a set of elements similar to those described above including a piston 54, a sleeve 55, and a sleeve 56. Cooperating teeth 57 and 58 are provided on the piston 54 and the sleeve 56, respectively, and a thrust bearing 59 resides between the end of the sleeve 56 and the sleeve 55. The outer surface of the sleeve 56 is provided with a thread 61 which is engaged by a peg 62 in the housing and this thread is provided with the same hand as the thread 52 of the sleeve 46. A passage 63 enters the left-hand end of the rod 79 and extends axially through it and is provided with branch passages 64 and 65 which operate on occasion on the outer surface of the piston 38 and also bring about a balance of fluid pressures on opposite sides of the bearing 35.

Similarly, a passage 66 enters the left-hand end of the main housing of the inner portion 13 of the spindle and terminates at the left face of the piston 54 for its actuation on occasion and a branch passage 67 extends from the passage 66 to the outer side of the bearing 36 to provide balanced fluid pressure across that bearing.

As is further evident in FIG. 2, the block 15 is provided with two fluid inlet ports 68 and 69 which are suitably connected by conduits to a source of fluid pressure and valving for determining the introduction alternatively of fluid to these ports. The block 15 is normally fixed in the machine tool and does not revolve with the rest of the spindle and it is provided with a shaft 71 which extends from it into a bore 72 in the spindle. Ball bearings 73 and 74 extend between the shaft 71 and the bore 72 to support the spindle on the shaft. The passage 75 extends from the inlet port 68 to the inner end of the shaft where it lies opposite the passage 63 in the rod 79 for fluid communication therebetween. The port 69, however, is connected by a passage 76 to a sealed ring 77 which rotates with the spindle and which is connected to the passage 66.

The operation of the invention will now be readily understood in view of the above description. In generating a surface of revolution, the spindle 11 is rotated in its housing in the usual way carrying the cutting tool 14 in a circular path which, when the spindle is advanced axially, generates a surface of revolution. When it is desired to make the diameter of the surface of revolution larger, the radially movable tool slide or holder 16 is advanced (or retracted, if the diameter is to be made less) by rotation of the control rod 79. The coil springs 28 and 34 act as anti-backlash devices so that a rotary motion of the control rod 79 imparts to the block 22 a longitudinal motion along the axis A—A. Because the block lies in the inclined slot 17 this produces slight radial motion of the tool holder 16. This positions the tool holder to a desired distance from the axis. The anti-backlash springs 28 and 34 and springs 80 and 81 prevent unwanted motion at the tool holder. The indicator 83 is provided to show the general position of adjustment, so that tool setting is facilitated.

At the rear of the spindle, the means is provided to to impart a controlled amount of rotary motion to the control rod 79. As has been stated above, this means consists of an inner rod to which are keyed the two sliding pistons 38 and 54 with their sleeves 39 and 55. Let us assume, for example, that we wish to advance the tool 14 rather than retract it. Pressure air would be introduced by the conventional hydraulic control means including valving to introduce pressure oil to the inlet port 68. This oil pressure makes itself felt through the passage 75, the passage in the rod 71, and the passage 63 on the right-hand face of the piston 38. The piston moves to the left against the pressure of the coil spring 43 and, eventually, the teeth 48 engage the teeth 47 on the sleeve 52. The piston and the sleeve 52 after that move together axially to the left. Now, since the pin 53 engages the thread 52 on the sleeve 46, axial motion of the sleeve 46 brings about rotary motion. This rotary motion feeds back through the teeth 47 and 48 to the piston 38 and its sleeve 44. Since the sleeve 44 is locked to the rod 19 by a key 41, this produces rotary motion of the rod 19 which, in turn, causes an advance of the tool 14. In a similar way, introduction of pressure oil at another time to the inlet port 69 causes a similar axial advance of the piston 54 toward the right and the subsequent rotation of the rod 79 in the opposite direction. It will be understood that the hydraulic fluid may either be a conventional liquid or it may be a pneumatic operated system. The return of each of the pistons to its original position, as shown in FIG. 2, is accomplished by simply removing the pressure fluid and letting the spring 43 press the assemblage rearwardly. In order to prevent this return action from rotating the rod 79, the thrust bearings 51 and 59 are provided to make sure that the return of the piston does not result in rotation of the control rod; that is, the piston 38, for instance, moves back to the left. The first thing that happens is that the teeth 47 and 48 separates, the sleeve 46 being left behind. Eventually, it engages the thrust bearing 51, however, and is carried along with the sleeve 39. It is caused to rotate, of course, by the thread 52 and the pin 53, but this rotation is not transmitted to the sleeve 39 or the piston 38 and, therefore, to the control rod 79 because the thrust bearing 51 reduces the friction to the point where such rotary driving does not take place. It is possible with the present mechanism, of course, to retract the tool 14 radially after the bore has been completed and before the spindle is removed from the finished bore. This means that the usual drag-out line does not appear on the finished workpiece.

In general, it might be said that the inner portion 13 produces a predetermined increment of rotation in its central rod 79 which is translated by clock 31 into an increment of longitudinal motion in rod 19. This is translated into a smaller increment of lateral motion of tool holder slide 16 through block 22.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machine tool, comprising:
   (a) a spindle adapted to be mounted for rotation about a central longitudinal axis,
   (b) a cutting tool holder mounted at one end of the spindle for adjustment radially of the axis,
   (c) an adjusting rod mounted in the spindle and extending axially thereof to cause when rotated a radial adjustment of the tool holder,
   (d) two sleeves mounted for sliding motion relative to the rod and having same hand long-lead threads formed on their outer surfaces,
   (e) a piston associated with each sleeve for moving it axially, and
   (f) means for introducing pressure fluid to one of the pistons to move it axially and cause the sleeve and rod to rotate.

2. A machine tool as recited in claim 1, wherein a secondary sleeve is slidably mounted directly on and keyed to the rod, wherein the first-mentioned sleeve is slidably and rotatably mounted on the secondary sleeve, and wherein a toothed coupling is formed to join the piston and the first-mentioned sleeve together during energization of the piston.

3. A machine tool as recited in claim 2, wherein a coil spring extends around the rod, extends between the two secondary sleeves, and serves to bias each secondary sleeve in a direction opposed to the direction of energization of the piston.

4. A machine tool as recited in claim 2, wherein the piston is provided with an axially-extending flange formed with a set of teeth and the first-mentioned sleeve is provided with a set of teeth which extend in opposition to the teeth on the flange, the sets of teeth being complementary to form the coupling.

5. A machine tool as recited in claim 1, wherein the tool holder is provided with a slot having opposed parallel surfaces which are inclined at a slight angle to the axis and the adjusting rod has a transverse block that resides slidably in the slot.

6. A machine tool as recited in claim 1, wherein a block resides at the other end of the spindle to be fastened against rotation and to which pressure fluid is connected and wherein a shaft extends from the block and lies axially within the said other end of the spindle to introduce the fluid to one piston or the other.

7. A machine tool as recited in claim 6, wherein two parts enter the block for alternate supply of pressure fluid, there being a separate path from each part to one of the pistons.

References Cited

UNITED STATES PATENTS

| | | | |
|---|---|---|---|
| 2,237,692 | 4/1941 | Stewart | 77—58 |
| 2,820,376 | 1/1958 | Jannenga et al. | 77—3 |
| 2,826,943 | 3/1958 | Townsend | 77—58 |
| 3,443,458 | 5/1969 | Ohrnberger et al. | 77—58 |

FOREIGN PATENTS 990,961   5/1965   Great Britain.

GERALD A. DOST, Primary Examiner